United States Patent [19]

Futrell

[11] Patent Number: 4,746,161
[45] Date of Patent: May 24, 1988

[54] TRUCK BED INTERIOR

[76] Inventor: Gary W. Futrell, 5509 Kanehill, Lakewood, Calif. 90713

[21] Appl. No.: 42,327

[22] Filed: Apr. 24, 1987

[51] Int. Cl.⁴ .............................. B60P 3/32; B60R 9/06
[52] U.S. Cl. .................................. 296/24 R; 296/1 F; 296/10; 296/37.6; 296/39 R; 5/118; 297/232
[58] Field of Search .............. 296/1 F, 10, 24 R, 37.6, 296/39 R, 39 A, 164, 170, 196, 197; 297/232, 440; 5/118

[56] References Cited

U.S. PATENT DOCUMENTS

| | | | |
|---|---|---|---|
| 3,751,103 | 8/1973 | Robertson | 296/24 R X |
| 3,880,458 | 4/1975 | Jackson | 296/164 |
| 4,003,596 | 1/1977 | Robertson | 296/37.6 X |

Primary Examiner—Dennis H. Pedder
Attorney, Agent, or Firm—Charles H. Thomas

[57] ABSTRACT

Cushioned components are arranged to fit together in laterally immobilized fashion to form a furnished interior for the bed of a pick-up truck. The assembly is constructed of modular pieces which, when assembled, form a pair of seats above the wheel wells of the truck bed and a storage compartment extending across the width of the truck at the forward end of the truck bed. All surfaces of the assembly that are directed toward the truck bed interior are cushioned with carpeting, fabric, or padding. The modular components may be quickly assembled and disassembled, so that the bed of the pick-up truck may be utilized for heavy duty work within the furnished interior assembly, and then transformed into a luxurious den within the space of a few minutes.

10 Claims, 5 Drawing Sheets

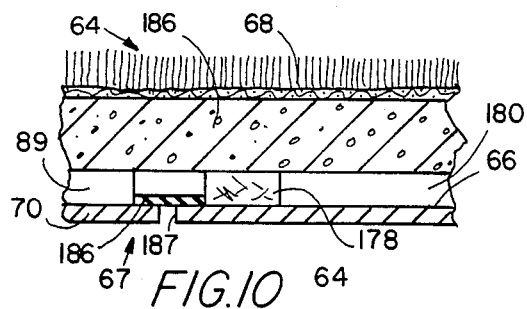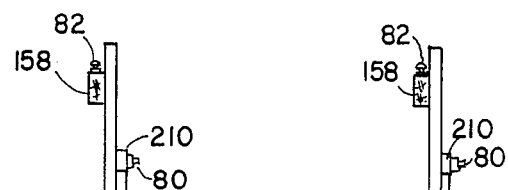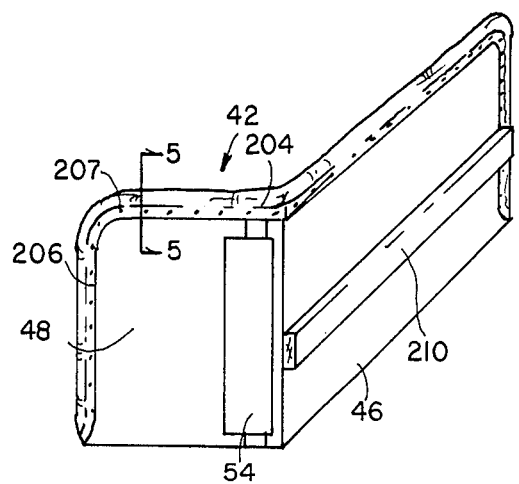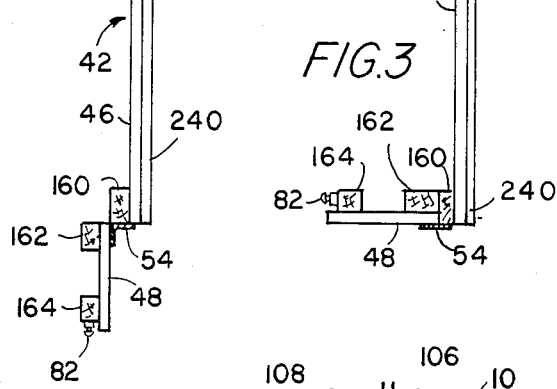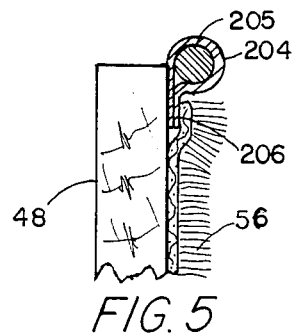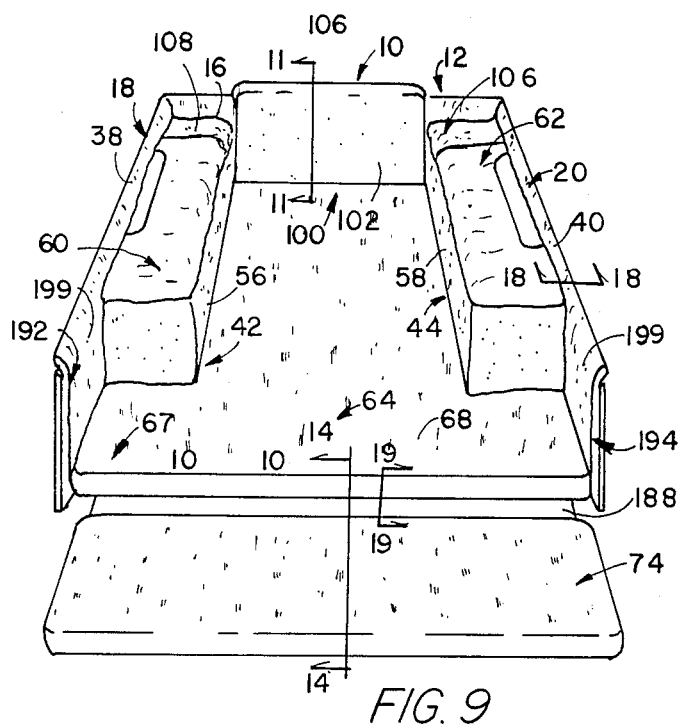

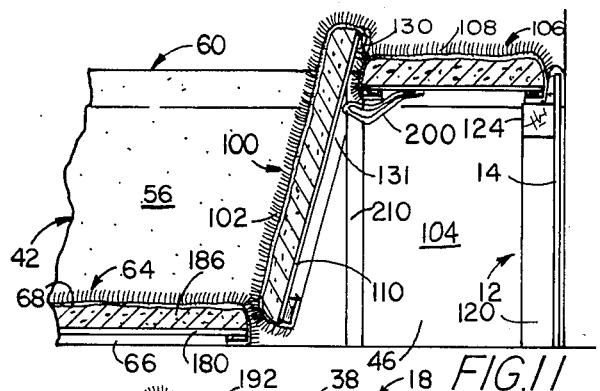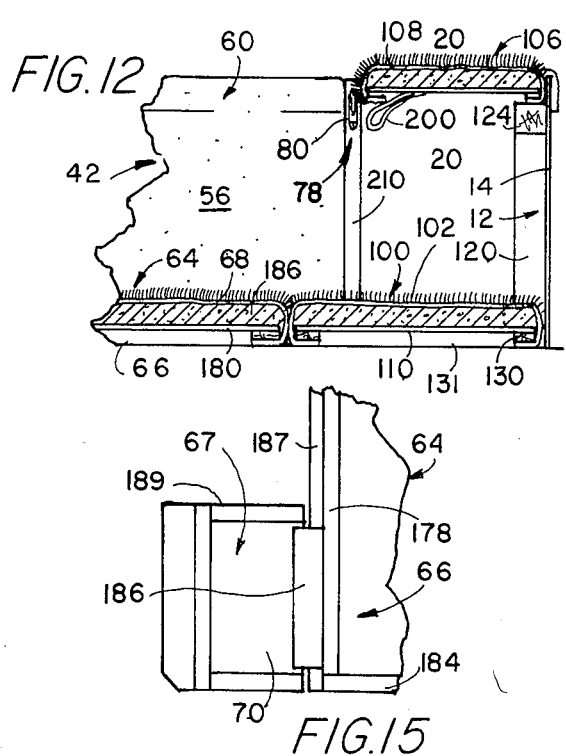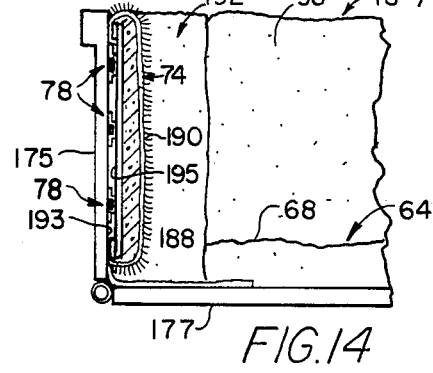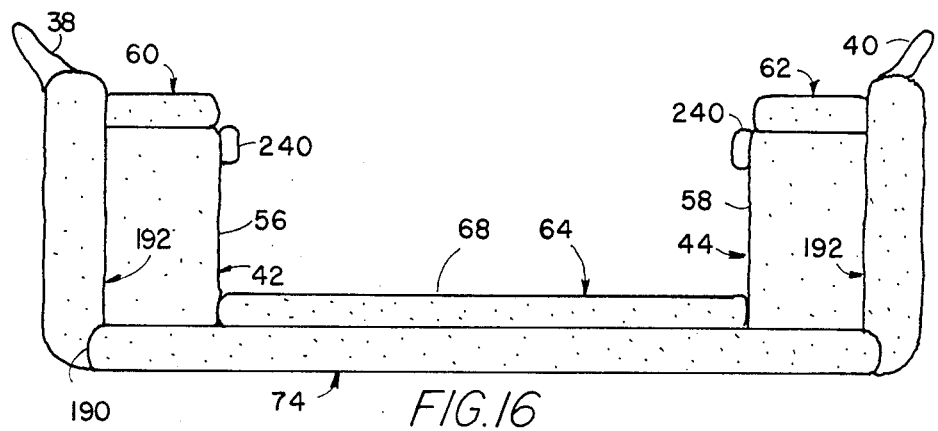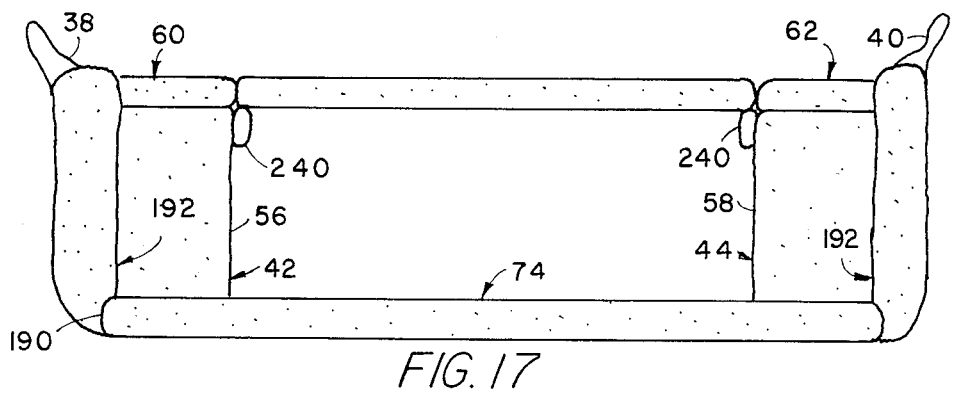

TRUCK BED INTERIOR

BACKGROUND OF THE INVENTION

1. Field of the Invention

The present invention relates to conversion kits for providing the bed of a pick-up truck with a readily removable cushioned, furnished interior.

2. Description of the Prior Art

Prior kits for converting the bed of a pick-up truck from an austere, steel surfaced cargo enclosure, as shipped from the manufacturer, to a comfortable, cushioned accommodation for relaxation have been more or less permanent in nature. This is, a conventional conversion assembly requires a considerable time to install and is not easily removable. Accordingly, the user of the pick-up truck cannot readily use the truck for heavy duty working operations during the day, and then transform the bed of the pick-up truck to a comfortable, luxurious den at night. With conventional interiors, the assembly and disassembly of the cushioned interior components is fairly time consuming. Moreover, in conventional pick-up truck truck bed interiors some form of attachment of the truck bed interior components to the metal walls, bulkhead, or bottom of the truck cargo bed is required.

SUMMARY OF THE INVENTION

The present invention is a modular assembly of component pieces of a removable truck bed furnishing assembly which, when arranged together, form a cushioned interior for a pick-up truck. When assembled, the cushioned pick-up truck interior is provided with a pair of opposing bench-type seats, extending parallel to the alignment of the vehicle and located above the rear wheel wells in the truck bed. Also, the walls of the interior, as well as the forward bulkhead and tailgate, are cushioned. The floor of the furnishing assembly includes soft foam padding with cushioning thereover. The surfaces of the assembly which are directed toward the interior of the truck bed, including the walls, bulkhead and floor thereof, are cushioned. An occupant of the truck bed is thereby provided with a comfortable, clean and luxurious environment. Where a shell, such as a camper shell, is secured over the truck bed, the cushioned interior of the invention also provides both acoustic and thermal insulation.

The component parts of the truck bed furnishing assembly of the invention include a backboard, left and right sideboards, left and right seat supports, cushioned seats, a floor and a tailgate cover, all snugly fitted together in interlocking fashion. A plurality of releasable fasteners are provided to effectuate the interlocking engagement of the sideboards and the side seat supports. The releasable fasteners are formed of separable pieces, mating portions of which are attached to the backboard, the sideboards and the side seat supports. The releasable fasteners are designed to laterally immobilize interconnected pieces when positioned in installed vertical alignment, but to allow the separation of the furnishing assembly components when the separable pieces are in vertical misalignment.

The floor of the assembly fits between the left and right side seat supports and forces the side seat supports to push the left and right sideboards outwardly snugly against the truck bed walls. Furthermore, the furnishing assembly floor may be equipped with a pair of folding ears at its rearmost extremity. The ears fold down behind the ends of the side seat supports, which do not extend the entire length of the truck bed. The folding ears thereby longitudinally immobilize the side seat supports, as well as the sideboards which are releasable secured to the side seat supports.

The truck bed furnishing assembly of the invention is preferably designed to fit a specific truck bed model having a predetermined bed size and geometry. For assemblies designed to fit into truck beds seven and eight feet in length, a headboard which serves as a storage partition is provided near the forward portion of the truck bed between the seat supports. Fasteners on the ends of the storage partition fit into vertical slots in mating fasteners defined on the left and right side seat supports. A storage area is thereby defined between the storage partition, the left and right side seat supports, and the backboard which is positioned against the truck bed bulkhead. A storage lid with cushioning thereon is supported by the backboard, the sideboards and by the side seat supports. To provide extra length to allow a person to sleep, the padded headboard concealing the storage area is hinged along a transverse hinge. The cushioned headboard covering the storage area can be lifted and folded down flat in coplanar relationship with the furnishing assembly floor to form a floor extension, thereby providing additional length for comfort in sleeping. In the normal daytime position the headboard is folded upwardly to an inclined, nearly vertical position to form a comfortable seat back for a person seated on the furnishing assembly floor.

Preferably, both the storage lid and the cushioned floor of the assembly are provided with pull straps on their hidden surfaces, so that they may be conveniently pulled rearwardly out of the truck bed to facilitate disassembly and removal of the truck bed furnishing assembly of the invention.

The truck bed furnishing assembly of the invention is formed with a plywood frame of sufficient rigidity to provide a stiff framework for the assembly structure and to effectuate interlocking of the component members, but at the same time has sufficient flexure to prevent the components of the truck bed furnishing assembly from working loose from each other or breaking as a result of road vibration. The truck bed furnishing assembly is, to a large entent, constructed of one-half inch thick plywood, which is left uncovered on the surfaces of the components of the assembly which face the truck bed bottom and retaining walls. Accordingly, the assembly components can be quickly assembled and interconnected in the bed of a pick-up truck, even if the truck bed contains dust, spots of grease, or other material which could soil clothing. Since the occupant of a truck bed furnished with the assembly of the invention never contacts the back sides of the assembly pieces, and since the cushioned portion of the furnishing assembly components is entirely interiorly directed, the cushioned portion of the assembly cannot become soiled due to the existence of dirt or other contaminating material on the sheet metal bottom or retaining walls of the truck bed.

A plurality of specially designed releasable fasteners are employed in the assembly of the invention to prevent the cushioned, plywood backed component pieces from working loose or breaking due to flexure in the truck bed which results especially from road vibration as the truck is traveling. The releasable fasteners are formed of separable component elements which are laterally immobilized when assembled and positioned in vertical alignment. The fastener elements are separable when moved in vertical misalignment for disassembly. These fasteners are coupled to releasably interconnect the backboard, the headboard, the sideboards, and the side seat supports. Using these fasteners, the components of the furnishing assembly can be readily assembled by positioning the separable pieces of the fasteners in slightly offset vertical misalignment and then engaging them. The assembly components are then adjusted slightly in a vertical direction to bring them into assembled vertical alignment, whereupon the fasteners become laterally immobilized.

A further important feature of the invention which prevents the joints of the assembly components from working loose involves the use of hinges, preferably fabric, and preferably formed of nylon fabric panels. These fabric hinges are used to join the upright partitions of the seat supports. They are also used to divide the horizontally disposed storage covers into lids which can be swung open and shut for storage area access. The same type of hinges may also be used to join the outwardly extending ears to the main body of the floor of the assembly. The fabric hinges are secured in position with a staple gun or by nails. Because the hinges are formed of fabric, they can resiliently yield in any direction, and are not weakened by the repeated application of shearing and torsional forces, as are rigid hinges.

In one preferred embodiment of the invention a pair of parallel, horizontally disposed rails are formed along the facing surfaces of the left and right sideboards. The padded floor of the assembly can alternatively be positioned in contact wih the bed of a pick-up truck between the left and right sideboards to form a floor, or it can be withdrawn and re-inserted in a horizontal disposition and at an elevated level atop the rails so that its upper surface is at essentially the same horizontal level as the top surface of the adjacent cushioned seats. When the padded floor is elevated in this fashion, it serves as the central portion of a wide bed, which also includes the tops of the cushioned seats. Articles may be stored for the night beneath the floor section when it is elevated in this manner.

The invention may be described with greater clarity and particularity by reference to the accompanying drawings.

DESCRIPTION OF THE DRAWINGS

FIG. 2 is a top plan view of the frame of the left side seat suppor of the truck bed furnishing assembly of FIG. 1 showing operation of the fabric hinge thereof.

FIG. 3 is a top plan view of the frame of the left side seat support of FIG. 1 showing the partitions of the seat support in their normal dispostions when installed.

FIG. 4 is a perspective view of the frame of the left side seat support before installation of the cushioning thereon.

FIG. 5 is a sectional detail of the left side seat support of FIG. 4, taken along the lines 5—5 after installation of the cushioning thereon.

FIG. 9 is a perspective view of one embodiment of a completed truck bed furnishing assembly according to the invention employing the framing elements of FIG. 1.

FIG. 10 is a sectional detail of the edge of the truck bed floor adjacent a side seat support taken along the lines 10—10 of FIG. 9.

FIG. 11 is a sectional elevational detail taken along the lines 11—11 of FIG. 9.

FIG. 12 is a sectional elevational detail showing the seat back of FIG. 11 in an alternative position.

FIG. 13 is a sectional plan detail showing the construction of one of the end flaps of one of the sideboard assemblies of FIG. 9.

FIG. 14 is a sectional detail taken along lines 14—14 of FIG. 9 showing the tailgate thereof in a closed position.

FIG. 15 is a top plan detail showing a modification to the floor frame of FIG. 1.

FIG. 16 is an end view showing one embodiment of the invention with a sliding floor section in a lowered position.

FIG. 17 is an end view of the embodiment of FIG. 16 showing the sliding floor section thereof in a raised position.

DESCRIPTION OF THE EMBODIMENT

Figure 1:
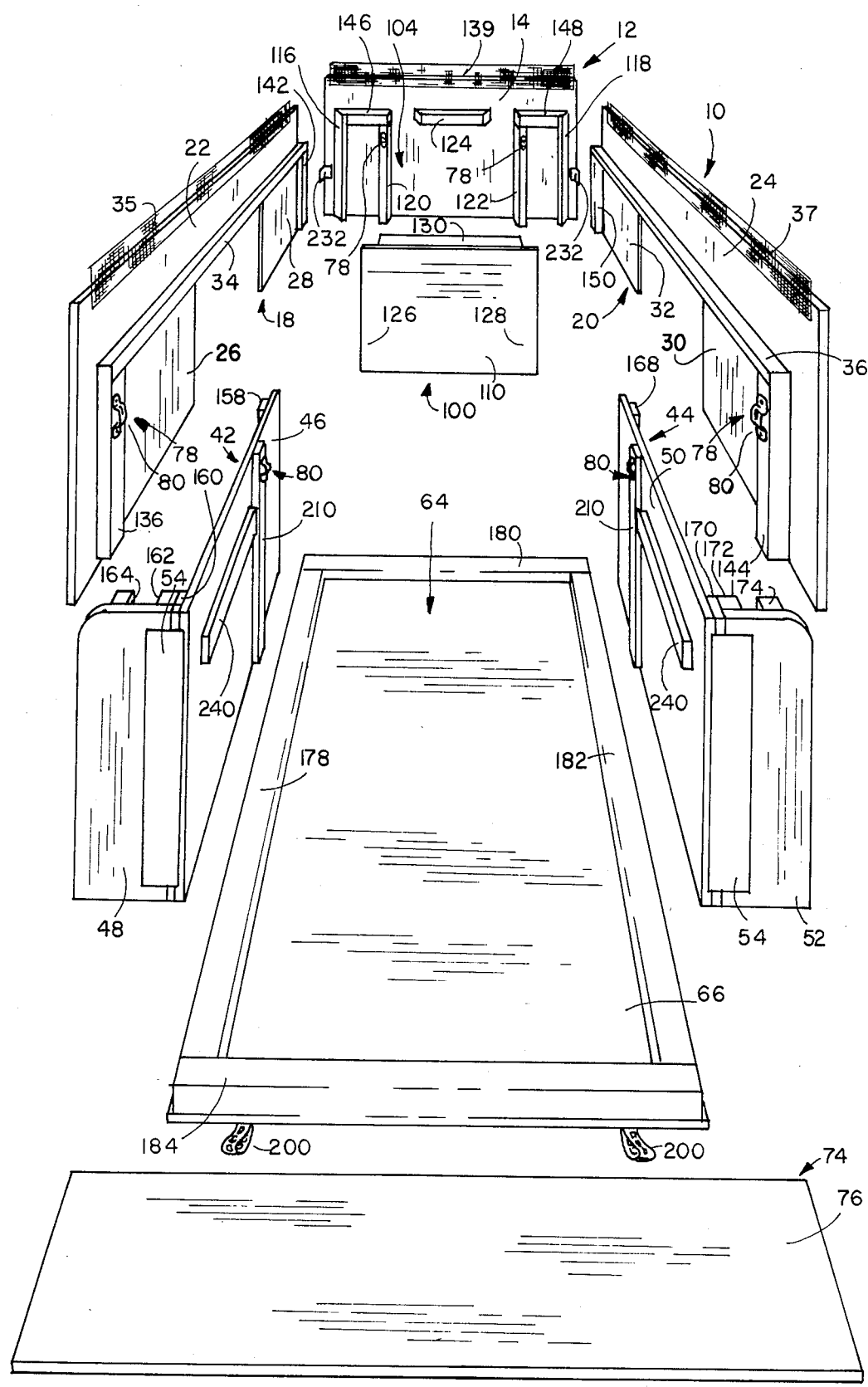
FIG. 1 is an exploded perspective view of many of the assembly components of the truck bed furnishing assembly of the invention, with cushioning omitted for the sake of clarity.

FIG. 1 illustrates the frames of the component parts of a removable truck bed furnishing assembly 10. The cushioning and padding on the component parts which are present in the finished product have been omitted in FIG. 1 for the sake of cla ity of illustration of the frame parts depicted. The truck bed furnishing assembly 10 is viewed in FIG. 1 from the rear as it would be inserted into the bed of a pick-up truck.

The furnishing assembly 10 includes a backboard 12 having a rigid frame 14 with interiorly directed cushioning 16 thereon, visible in FIG. 9. The backboard 12 extends the width of a pick-up truck bed at the forward bulkhead thereof. A left sideboard 18 and a right sideboard 20 are provided having rigid frames 22 and 24, respectively, depicted in FIG. 1.

The terms "left" and "right", as used herein, refer to the relative positions of components as viewed from the rear of the truck bed furnishing assembly 10 and from the rear of the truck bed into which it is inserted. The term "forward" refers to the direction toward the bulkhead and cab of the truck, while "rear" refers to the direction toward the tailgate. "Interior" refers to those surfaces of the assembly components exposed toward the center of the enclosure of the truck bed, while "exterior" refers to surfaces of the assembly components facing the truck bed retaining walls and bottom of the truck bed.

Figure 18:
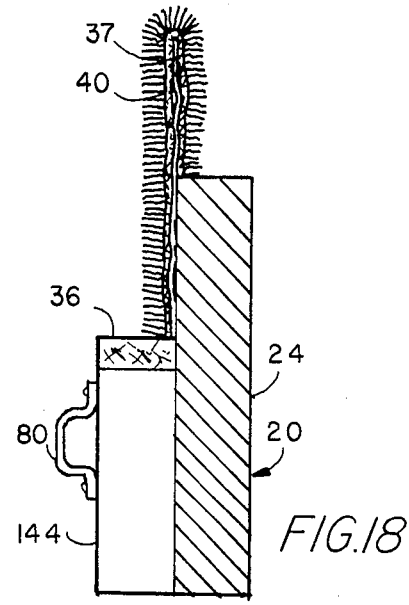
FIG. 18 is a sectional elevational detail taken along the lines 18—18 of FIG. 9.

The frames 22 and 24 extend the length of the truck bed and are rectangularly shaped at the ends, 26, 28 and 30, 32, respectively, to rest on the bottom of a truck bed. As is evident in FIG. 1, the frames 18 and 20 define rectangular gaps forming recessed centers between the ends 26, 28 and 30, 32 to bridge the rear wheel wells in a pick-up truck bed. The sideboards 18 and 20 also have longitudinal seat support rails 34 and 36, respectively, above the vertically recessed centers. The rails 34 and 36 are preferably constructed of pine framing, about ¾ inches by 1-½ inches in cross section. Above the rails 34 and 36 stiff, elongated bands 35 and 37 of wire mesh, of the type sold as "chicken wire", are secured by staples to the frames 22 and 24, respectively. The wire mesh bands 35 and 37 are inelastically deformable to conform to the contour of the truck bed walls. Carpeting is secured to the sideboards 18 and 20 to cover the exposed, interior faces of the frames 22 and 24. The carpeting extends over the tops and down the backs of the wire mesh bands 35 and 37 to provide cushioned seat backs 38, 40, respectively, as depicted in FIGS. 9 and 18.

Left and right side seat supports 42 and 44, respectively, each have a pair of upright partitions 46, 48 and 50, 52 respectively, visible in FIG. 1. The adjacent partitions 46, 48 and 50, 52 in the two side seat supports are joined together by vertical hinges 54, foldable to form right angles, as illustrated in FIGS. 1 and 3. The left and right side seat supports 42 and 44 have interiorly directed cushioning 56 and 58, respectively, thereon, as illustrated in FIG. 9. Cushioned seats 60 and 62 are positioned atop the side seat supports 42 and 44, respectively, and atop the seat support rails 34 and 36, respectively, of the sideboards 18 and 20. The seats 60 and 62 cover the wheel wells of a truck bed and are visible in FIG. 9.

A floor 64 is positionable on the bed of a truck between the side seat supports 42 and 44, as depicted in FIGS. 1 and 9. The floor 64 has a rigid plywood backing 66, depicted in FIG. 1, with upwardly directed cushioning 68 thereon, as depicted in FIGS. 9, 10 and 14.

Depending upon the length of the bed of the pick-up truck in which the truck bed furnishing assembly 10 is installed, the side seat supports 42 and 44 may extend the entire length of the bed of the pick-up truck, as indicated in FIG. 1. In such a construction the floor 64 is fabricated in a rectangular form and is substantially equal in length to the lengths of the longitudinal upright partitions 46 and 50. In pick-up trucks having longer beds, however, the floor 64 will be formed in a "T-shaped" configuration, as depicted in FIG. 9.

In the embodiment of FIG. 9 the floor 64 has upwardly foldable cushioned ears 67, one of the rectangular frames 70 of which is depicted in detail in FIG. 15. The cushioned ears 67 extend laterally from either side of the rigid backing 66 behind the seat supports 42 and 44 at the rear of a truck bed.

As illustrated in FIGS. 10 and 15, rectangularly shaped nylon fabric panels 186 are stapled to the marginal edges 187 of the floor backing 66 outside of three-quarter inch by one and one half inch pine stripping sections 178 and 182 and to rectangular plywood ear frames 70. The panels 186 thereby form hinges by means of which the ears 67 are foldable upward relative to the floor backing 66. This facilitates insertion and removal of the floor 64 into and out of the bed of a pick-up truck.

A cushioned tailgate cover 74 is mounted upon the interior surface of a truck bed tailgate 175, as depicted in FIGS. 9 and 14. The rigid rectangular frame 76 of the cushioned tailgate cover 74 is depicted in FIG. 1.

Figure 7:
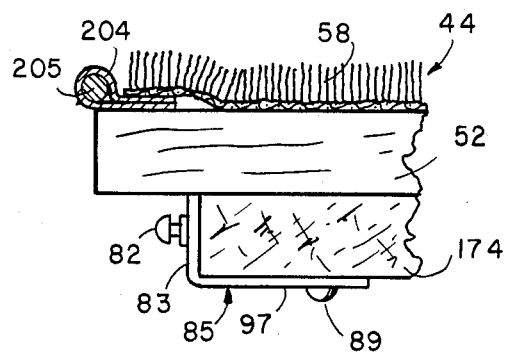
FIG. 7 is a top plan detail viewed along the lines 7—7 of FIG. 6.
Figure 6:
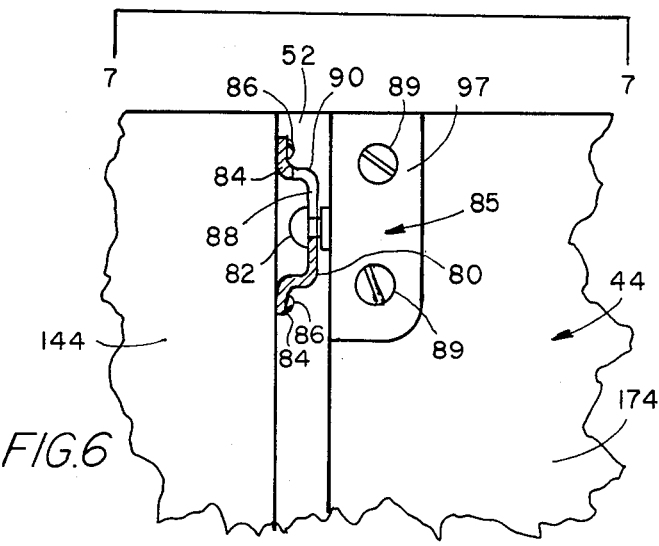
FIG. 6 is an elevational detail showing one of the releasable fasteners employed in the embodiment of FIG. 1 looking toward the rear at the junction of the right side seat support with the right sideboard.
Figure 8:
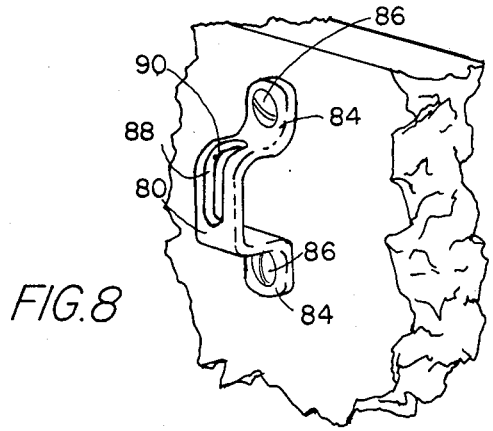
FIG. 8 is a perspective view of one of the elements of the fastener of FIG. 6.

A number of the components of the removable truck bed furnishing assembly 10 are joined together by a plurality of releasable fasteners 78, illustrated in detail in FIGS. 6, 7 and 8. The fasteners 78 are each comprised of separable pieces or elements 80 and 82 which are laterally immobilized when in vertical alignment. As depicted in FIG. 6, the fastener elements 80 and 82 are coupled to releasably interconnect the sideboards 18 and 20 to the side seat supports 42 and 44.

As depicted in FIGS. 6 and 8, the fastener piece 80 is formed as a shallow, U-shaped clip with out-turned feet 84 which are fastened by screws 86 flush against some of the components of the removable truck bed furnishing assembly 10. Because of its construction, the center of the U-shaped clip 80 stands out from the stripping or frame member to which it is attached, so that a gap exists to accommodate the enlarged head of the other fastener member 82. The U-shaped clip 80 has a vertical slot 88 defined in the central portion thereof. The slot 88 has an enlarged entry 90 at its upper extremity, as best depicted in FIG. 8.

The fastener 82 is an oval fillister head wood screw which is screwed into one of the truck bed furnishing assembly components to be joined. The fastener 82 passes through one leg 83 of a reinforcing backing angle 85, the other leg 97 of which resides in contact with the edge of the frame member in which the screw 82 is embedded parallel to the shank of the screw 82, as depicted in FIGS. 6 and 7. Both of the legs 83 and 97 of each of the angles 85 are secured flush against the surfaces of the frame member to be joined into which the fastener screw 82 is directed by means of smaller screws 89. The angles 85 aid in stabilizing the interconnection of the sideboards 18 and 20 and the seat supports 42 and 44. As depicted in FIG. 6, the shank of the wood screw 82 is screwed so that its head approaches contact with the leg 87 of the angle 85, but a sufficient gap is left so as to accommodate the thickness of the central portion of the U-shaped fastener clip 80.

In larger model pick-up trucks, those having seven and eight foot long cargo beds, a headboard or storage partition 100 may be employed at the forward end of the truck bed at a spaced distance rearwardly from the backboard 14. The storage partition 100 has interiorly directed cushioning 102 thereon, as depicted in FIG. 9. The storage partition 100 is positioned transversely across a truck bed to extend between the left and right seat supports 42 and 44. The storage partition 100 is releasably secured to the left and right seat supports 42 and 44 by fasteners 78, the clips 80 of which are visible in FIGS. 1 and 12, to define a storage space, indicated 104 in FIG. 11, located between the backboard 12, the side seat supports 42 and 44, and the storage partition 100. A storage lid 106 is provided with cushioning 108 thereon, as illustrated in FIGS. 9, 11 and 12. The storage lid 106 is supported by the backboard 12 and by the forward ends of the side seat supports 42 and 44.

As illustrated in FIGS. 11 and 12, the storage partition 100 may alternatively serve as a back support to a person seated on the floor 64, or it may be folded down flat in coplanar relationship with the floor 64 to form a floor extension, thereby providing additional length for comfort in sleeping on the floor 64. FIG. 11 illustrates the partition 100 disposed in a generally upright inclined but nearly vertical disposition in which it is normally maintained during the daytime. While the partition 100 is in the upright position of FIG. 11, various articles, such as beverage coolers and the like may be stored in the storage space 104. The partition 100 forms a comfortable seat back for a person seated on the floor 64. However, to provide additional leg room the storage lid 106 may be lifted and the fastening mechanisms 78 securing the partition 100 to the side seat supports 42 and 44 may be disengaged. The partition 100 may then be folded down flat at the forward end of the floor 64 adjacent the backboard 12. The cavity formerly serving as storage space 104 is then available to provide additional leg room to a person sleeping on the floor 64.

The frame 14 of the backboard 12, the frames 22 and 24 of the sideboards 18 and 20, the frame 110 of the storage partition 100, the backing 66 of the floor 64, the frame 76 of the tailgate cover 74, and the upright partitions 46, 48, 50 and 52 of the left and right side seat supports 42 and 44 are all constructed of one-half inch thick plywood. The frames of the components of the truck bed furnishing assembly 10 also include reinforcing stripping which is formed of lengths of 1 × 1½ inch pine lumber, visible in FIG. 1. The narrow edges of the stripping sections are glued to the plywood sheets of the backboard 12, the left and right sideboards 18 and 20, the side seat supports 42 and 44, and to the floor backing 66. In fastening the stripping sections, it is advisable to position each stripping segment against the flat panel of the frame member to which it is to be attached and to drill a pilot hole through the stripping into the plywood frame. The part is then turned over, glue is applied to the stripping section, and the glued side of the stripping section is placed against the plywood frame to which it is to be attached and secured in position with wood screws.

Because considerable stress is exerted on the stripping sections secured to the left and right sideboards 18 and 20, it is advisable for those stripping sections to be secured to the plywood frames upon which they are mounted by screws spaced at intervals, in addition to gluing in the manner previously described. Also, nails should be driven into the right angle joints to secure the transverse stripping sections to the upright stripping sections.

In fastening the stripping pieces to the frame 14 of the backboard 12, outside stripping sections 116 and 118 are secured in upright disposition, as indicated in FIG. 1. Inside stripping sections 120 and 122 are inset from the outside stripping sections 116 and 118, for securement to the side seat supports 42 and 44. A horizontal, stripping section 124 is secured against the frame 14 to extend transversely within the inside stripping sections 120 and 122.

The storage partition 100 serves as an inset headboard adjacent the forward ends of the bench seats 60 and 62. A transverse stripping section 130 is secured across the forwardly facing surface of the top of the frame 110 of the partition 100. Upright stripping sections 131 (FIGS. 11 and 12) support the stripping section 130 and are attached to the forwardly facing surface of the partition frame 110.

The upright stripping sections 131 on the flat, plywood frame 110 are secured to stripping sections 210 on seat supports 42 and 44 by means of fasteners 78. Stripping sections 158 and 168 on seat supports 42 and 44 are likewise attached to stripping sections 120 and 122 on the frame 14 of the backboard 12 by fasteners 78.

Upright stripping sections 136 and 142 are located on the interiorly directed face of the frame 22 on the left sideboard 18, while corresponding upright stripping sections 144 and 150 are located on the interiorly directed face of the frame 24 on the right sideboard 20, all with their narrow edges secured against the associated frames 22 and 24 in the manner previously described. Longitudinal stripping sections form the seat support rails 34 and 36. The rails 34 and 36 also support the outboard ends of the storage lid 106. Transverse stripping sections 146 and 148 are secured to the frame 14 of the backboard 12 and also aid in supporting the storage lid 106.

The left and right side seat supports 42 and 44 are constructed with reinforcing stripping sections 158, 160, 162, 164, 168, 170, 172 and 174, glued and screwed to the upright partitions 46, 48, 50 and 52, as illustrated in FIGS. 1-3. The stripping sections on the left and right side seat supports 42 and 44 are secured with their broad 1-½ inch side facing the flat partitions to which they are secured. The vertical fabric nylon hinges 54 are secured in position by staples, applied with a staple gun, to join the adjacent upright pairs of partitions of the seat supports 42 and 44. The fabric hinge panels 54 are thereby fastened to both of the two adjacent partitions in each pair of partitions of the side seat supports 42 and 44.

The partitions 46 and 48 are normally disposed at right angles when installed in a truck bed, as depicted in FIG. 3. The hinge panels 54 can be bent, however, to allow the partitions to extend parallel to each other to facilitate insertion into a truck bed and removal therefrom. It should be noted that the stripping sections 164 and 174 are inset slightly from the outwardly directed edges of the upright partitions 48 and 52. This allows the upright edges of partitions 48 and 52 to receive lateral support from the stripping sections 136 and 144 on the sideboards 18 and 20 when the fillister screws 82 of the fasteners 78 are secured in the U-shaped clips 80 in the manner depicted in FIG. 6.

Before cushioning the side seat supports 42 and 44 wih carpeting, tubular vinyl trim 204 surrounding a flexible, cylindrical rubber core 205 is installed. The marginal tab 206 of the vinyl trim 204 is stapled by means of staples 207 on the left and right side seat supports 42 and 44 in the manner depicted in FIGS. 4 and 5. Next, the carpeting sections 56 and 58 are applied to the interiorly facing surfaces of the seat supports 42 and 44. The edge of the carpeting is shoved up under the bead of the vinyl trim 204 to conceal the stapled edges 206, as illustrated in FIG. 5.

On the sideboards 18 and 20, carpeting sections are extended above the top edges of the flat plywood frames, over the wire mesh bands 35 and 37 and are stapled on the back sides of the frames 22 and 24 as depicted in FIG. 18. This same construction is carried through at the backboard 12 where carpeting is rolled over the top of the wire mesh band 139, depicted in FIG. 1.

To construct the floor 64, stripping sections 178, 180, 182 and 184 are glued, nailed and screwed to the plywood backing 66. The longer stripping sections 178 and 182 are three eighths of a inch from the longitudinal edges 187 (FIG. 15) of the floor 64, while the shorter stripping sections 182 and 184 are flush with the front and rear edges of the backing 66.

The cushioning on the interiorly directed surface of the truck bed furnishing assembly is largely formed of nylon carpeting. In addition, a 3-inch polyurethane foam pad 186 is used to cushion the floor 64. The foam pad 186 is cut to size around the outer perimeter of the stripping sections 178, 180, 182 and 184 where the floor 64 is of a rectangular configuration as indicated in FIG. 1. Where the floor 64 includes ears 67 as depicted in FIG. 10, the foam pad 186 is cut in a "T-shaped" pattern to cover the ear frames 70 as well. Contact cement is applied to the upwardly facing surfaces of the stripping sections of the floor 64 and to the edges of the foam pad 186 facing them. The glue is allowed to set up approximately five to ten minutes before the foam pad 186 is placed in position as indicated in FIG. 10. Next, the carpeting 68 is positioned atop the foam pad 186. When lined up, half of the carpeting 68 is folded back to expose the top of the foam pad 186, to which glue is then applied. The glue is allowed to set up before the carpeting 68 is repositioned. This operation is repeated on the other side of the floor 64. Next, the carpet and foam are compressed at the edges and the carpeting section 68 is stapled to the frame 66 at the marginal edges 187 outside of the stripping sections 178 and 182.

The stripping sections 178, 180, 182 and 184 are secured with their wide sides against the upwardly facing surface of the floor frame 66, so that a ¾ inch gap is left beneath a rectangular polyurethane foam pad 186 which is positioned on top of the stripping sections 178, 180, 182 and 184. This gap is illustrated in FIG. 10. This ¾ inch air pocket between the foam pad 186 and the plywood floor backing 66 provides some measure of ventilation and adds to the cushioning effect achieved on the floor 64.

The tailgate cover 74 has interiorly directed cushioning including a polyurethane foam pad 138 covered with carpeting 190 mounted on the backing frame 76. A plurality of releasable fasteners 78, of the type depicted in FIGS. 6, 7 and 8, secure the tailgate cover 74 to the interior surface 193 of a tailgate of a truck, depicted in FIG. 14. This installation is typically achieved by punching holes in the interior sheet metal surface of the truck tailgate 175 and engaging the screws 82 therein about half way. Next, the tailgate cover frame 76 is positioned over the tailgate. By striking the tailgate cover frame 76 with a hammer, the screws 82 in the tailgate 175 will leave an indentation in the underside 195 of the frame 76, thereby marking the screw positions. The U-shaped clips 80 are then positioned over the marks on the underside 195 of the tailgate cover frame 76 so that the tailgate cover 74 will be properly positioned on the tailgate 175 when installed. The backing angles 85 are not used in association with the fasteners 78 which secure the tailgate frame 76 to the truck tailgate 175.

Figure 19:
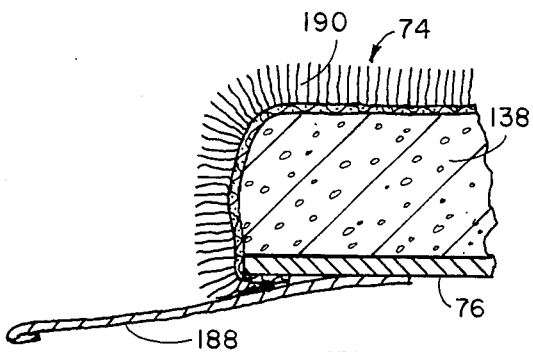
FIG. 19 is a sectional elevational isolated detail of a portion of the tailgate cover taken along the lines 19—19 of FIG. 9.

The tailgate cover 74 is installed prior to installation of the floor 64. As depicted in FIGS. 14 and 19, a vinyl tailgate skirt 188 extends forwardly from the tailgate cover 74 and beneath the floor 64. The polyurethane foam pad 138 serves as both a thermal and noise insulator. The tailgate cover 74 is useful for preventing drafts from coming in around the edges of the tailgate 175 of the truck, depicted in FIG. 14. The skirt 188 of the tailgate cover 74 is particularly helpful in excluding exhaust fumes and road filth from the interior of the truck bed 177.

To further exclude exhaust fumes, dirt and to insulate against road noise, it may be desirable for the sideboards 18 and 20 to be equipped with ears 192 and 194 hinged thereto at the rearmost extremity of each of the sideboards. These sideboard ears are illustrated in FIGS. 9 and 13. Each of the ears includes an inner foam core 196, as illustrated in the detail of FIG. 13. Rectangular panels of nylon fabric 197 are sewn to the rearmost extremities of the carpeting 199 which forms the seat backs 38 and 40. The ears 192 and 194 are attached to the plywood sideboard frames 22 and 24 by means of the nylon panels 197 at edges 198 thereof as depicted in FIG. 13, prior to installation of the cushioning 38 and 40. The foam cores 196 of the ears 192 and 194 are sandwiched between the rearmost extremities of the carpeting 199 and the nylon fabric 197. The sideboard ears 192 and 194 are thereby articulated by the flexible fabric hinges formed by the nylon panels 197 for ease of installation and removal of the truck bed furnishing assembly 10. The ears 192 and 194 cover the gaps between the pick-up truck retaining walls and the truck tailgate 175. The articulated connection of the ears 192 and 194 allows them to conform to the truck bed configuration to most effectively exclude road dust and prevent drafts.

In the embodiment of FIG. 9 the seats 60 and 62 are each constructed with a vinyl covering disposed over a foam cushion. The cushion and covering are supported upon a flat, plywood backing and the edges of the vinyl covering are wrapped about the edges of the foam and stapled to the underside of the wood seat bottom.

Figure 20:
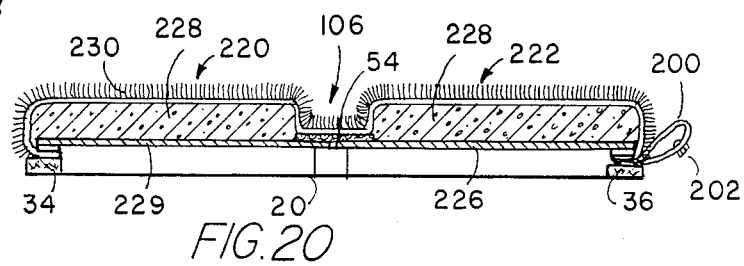
FIG. 20 is a sectional elevational detail of a modification of the embodiment of FIG. 12 taken along the lines 20—20 thereof.

FIG. 20 illustrates an alternative embodiment of a storage lid 106' for covering the storage space 104. The storage lid 106' is constructed of two generally rectangular sections 220 and 222, joined by a nylon hinge 54 in the manner previously described. The hinge 54 is stapled to flat, plywood bases 224 and 226, which are located end to end relative to each other. Polyurethane foam pads 228 are located atop each of the plywood bases 224 and 226, and a single expanse of carpeting 230 is used to cover the foam pads 228. As illustrated in FIG. 20, the carpeting 230 is stapled to the underside of the base 224 at one side of the truck bed and to the top side of the base 224, through the hinge 54 near the center of the truck bed. Likewise, the carpeting 230 is fastened by staples secured through the hinge 54 to the top side of the base 226. Additional staples secure the other outboard end of the carpeting 230 to the underside of the base 226.

With the lid construction of FIG. 20, either the section 220 or the section 222 may be rotated upwardly about the hinge 54 to provide access to the portion of the storage space 104 located therebeneath. The bifurcated construction of the storage lid 106' facilitates access to both portions of the storage space 104. The storage lid 106', when closed, rests atop the horizontally disposed stripping sections 34, 36, 124, 146, 148, and 131. The seats 60 ad 62 can also be modified to a construction of the type depicted in FIG. 20, if desired, to allow the space therebeneath to more conveniently be used as a storage area.

To facilitate removal of the component parts of the truck bed furnishing assembly 10, the floor 64, the storage lid 106 or 106' and the seats 60 and 62 are typically equipped with heavy fabric pull straps 200. The pull straps 200 are secured to the undersides of the floor 64, the storage lid 106 or 106' and the seats 60 and 62, as illustrated in FIGS. 1, 11, 12 and 20. The straps 200 may be equipped with snap sockets 202 for securement with corresponding snap fastener studs if desired. The strap 200 on the seat section 222 provides a convenient grip for lifting that seat section to gain access to the storage area therebeneath.

To assemble the removable truck bed furnishing assembly 10 in the bed of a pick-up truck, the backboard 12 is first positioned all the way forward in the truck bed against the truck bed bulkhead. Next, the left and right sideboards 18 and 20 are moved forward into the truck bed from the rear so that the forward edges of the frames 22 and 24 are captured in the gap between the stripping sections 116 and 118, and rearwardly extending angle plates 232 which are located outboard of the stripping sections 116 and 118.

The left and right side seat supports 42 and 44 are initially elevated slightly, relative to the backboard 12 and the sideboards 18 and 20 so that the fastening screws 82 and the U-shaped clips 80 are slightly vertically misaligned. This allows the heads of the screws 82 to pass downwardly through the enlarged entries 90 at the tops of the slots 88 in the U-shaped clips 80. The side seat supports 42 and 44 are then lowered slightly to their normal positions resting atop the bottom of the truck bed. When the side seat supports 42 and 44 are in this position, the heads of the fastening screws 82 are laterally immobilized within the slots 88 beneath the enlarged entries 90 at the upper extremities thereof. Fasteners 78 are used in this fashion to releasably connect the following pairs of stripping sections: 136–164, 120–158, 122–168, and 144–174. Next, the storage partition 100 is inserted from above by sliding it down so that fasteners 78 releasably engage it to the upright stripping sections 210 on the side seat supports 42 and 44.

The tailgate cover 74 is initially positioned so that the heads of the screws 82 are aligned with the enlarged entries 90 in the slots 88 of the clips 80. The tailgate cover 74 is then shoved from the rear to force the shanks of the screws 82 down into the slots 88 and away from the enlarged entries 90. The tailgate cover 74 is thereby firmly attached to the pick-up truck tailgate 175 by the fasteners 78 as depicted in FIG. 14, with the skirt 188 extending forwardly atop the rear of the bottom of the pick-up truck bed 177.

The floor 64 is then inserted from the rear of the truck bed between the upright longitudinally extending partions 46 and 50 of the side seat supports 42 and 44. If the floor 64 includes ears 67, these ears are lifted and rotated on the hinges 186 as the floor 64 is inserted, so as to clear the outboard end posts of the truck bed retaining walls. The ears 67 are then folded down flat against the bottom of the pick-up truck bed once the floor 64 is in position thereon.

The cushioned seats 60 and 62 are then positioned atop the side seat supports 42 and 44 and the seat support rails 34 and 36 of the sideboards 18 and 20. The storage lid 106 is similarly positioned forward of the storage partition 100 upon the storage lid support rails 124, 146 and 148 of the backboard 12, upon the support rails 34 and 36 of the frames 22 and 24, and upon the upper edges of upright partitions 46 and 50 of the side supports 42 and 44. The removable truck bed furnishing assembly 10 is then completely installed, as depicted in FIG. 9.

For removal, the parts are withdrawn in the reverse order in which they are installed. The straps 200, attached to the underside of the storage lid 106 or 106', the seats 60 and 62, and the floor 64, aid in the removal of these components of the assembly 10.

A further desirable feature of some of the embodiments of the invention is an elevated support by means of which the floor 64 can be mounted above the bottom of a truck bed. This provides an extra wide sleeping area and allows the space between the elevated floor 64 and the truck bed floor to be used for storage. For this purpose bed support rails 240, depicted in FIG. 1, are formed of $1 \times 1\text{-}\frac{1}{2}$ inch pine stripping and are secured by screws and glue to the upright longitudinally extending mutually facing frame partitions 46 and 50, about ten inches above the lower extremities thereof. The bed support rails 10 are directed interiorly toward each other, as depicted in FIG. 1, and are separated from each other by a distance of about one and one half inches less than the distance between the parallel, longitudinally aligned partitions 46 and 50. The carpeting 56 and 58 extends over the rails 240 and is stapled thereto so that the upper rails 240 define bearing ledges. The floor 64 can then be used as a slider to serve as a bed.

The floor 64 is removable from its normal position in contact with the bottom of the bed of a pick-up truck as depicted in FIG. 16, and is insertable between the left and right side seat supports 42 and 44 in an elevated position as depicted in FIG. 17. The floor is thereby supported by the bed support rails 240 at an elevated height above the truck bed bottom so that together with the seats 60 and 62, it forms an extra wide bed which is extremely comfortable for sleeping. During daylight hours the floor 64 can be returned to its normal position depicted in FIG. 16.

Figure 21:
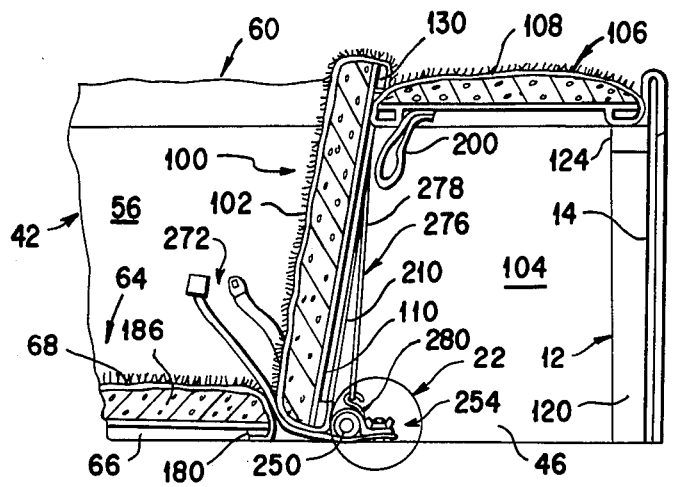
FIG. 21 illustrates an improvement to FIG. 11.
Figure 22:
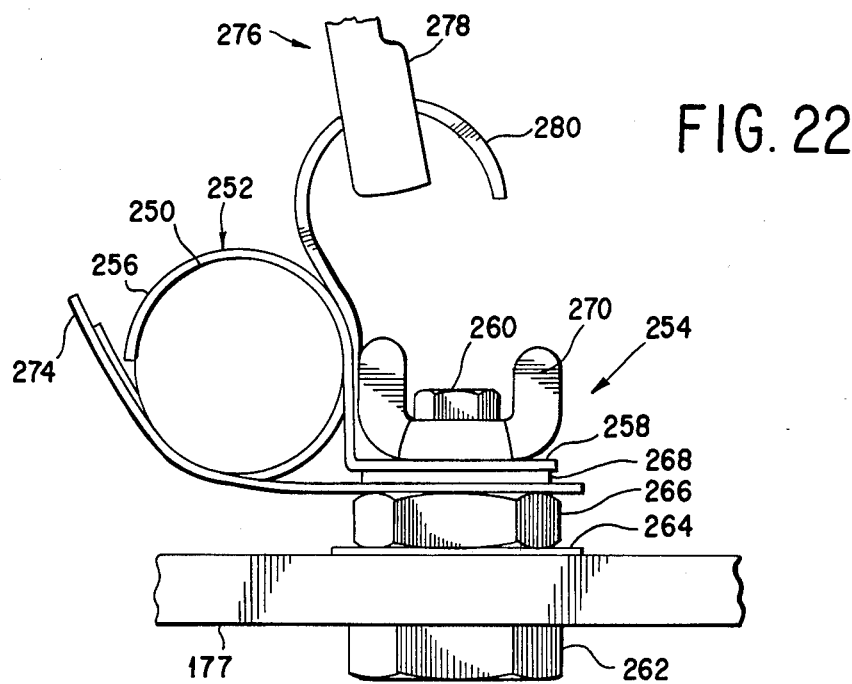
FIG. 22 is an enlarged detail indicated at 22 in FIG. 21.

FIGS. 21 and 22 illustrate an improvement to the furnishing assembly 10 at the storage partition 100. According to the improvement a transverse steel rod 250 three-quarters of an inch in diameter is located forward of the storage partition 100 in the storage space 104, as depicted in FIG. 21. The ends of the steel rod 250 passes through circular apertures in the partitions 46 and 50 of the left and right seat supports 42 and 44 near their lower extremities. The steel rod 250 is longer than the spatial separation between the partitions 46 and 50. The steel rod 250 is secured to the bottom of the pick up truck bed 177 by a pair of brackets 252 and anchor mechanisms 254, illustrated in detail in FIG. 22. The brackets 252 and the anchor mechanisms 254 are located between the partitions 46 and 50 and are installed closely adjacent thereto in spaced separation from each other. The brackets 252 include semicircular arcuate portions 256 which pass over and conform to the upper surface of the steel rod 250 and forwardly extending flanges 258. Apertures are defined in the flanges 258 to receive the shanks of anchoring bolts 260.

The anchoring mechanisms 254 each include a hollow lower bolt 262 which has a shank threaded interiorly and exteriorly that extends upwardly through the bottom of the pick up truck bed 177, a lower washer 264, a lower nut 266, an upper washer 268, and a solid upper bolt 260. The shank of the lower bolt 262 is threaded externally for engagement with the lower nut 266 and is also threaded interiorly to receive the threaded shank of the upper bolt 260. The upper bolt 260 has a hexagonal head and also a wing nut 270 welded thereto. The wing nut 270 facilitates installation of the bolt 260.

The anchor assemblies 254 are utilized to secure the steel rod 250 and also to secure a seat belt 272 which extends across the interior space within the enclosure of the truck bed between the left and right side seat supports 42 and 44 at the storage partition 100. To secure the seat belt 272 and the rod 250 to the truck bed 177, holes are drilled in the bottom of the truck bed 177 at locations just within the partitions 46 and 50. At each hole in the truck bed the shank of a hollow, lower bolt 262 is then inserted upwardly from the bottom of the truck bed 177, with the head of the lower bolt 262 bearing against the underside of the bottom of the truck bed 177. The washer 264 is then positioned about the shank of the lower bolt 262, and the nut 266 is threadably engaged upon the exterior thread of the shank of the bolt 262, and tightened against the washer 264 to secure each anchor mechanism 254 to the truck bed 177.

The fastening loop at an end of each seat belt strap 274 is then positioned about the upwardly extending shank of the lower bolt 262 of each anchor mechanism 254 and washer 268 is pressed downwardly, thereby sandwiching the fastening loop of the seat belt 272 between the nut 266 and the washer 268. The bracket 252 is then positioned as illustrated in FIG. 22 with the opening in the flange 258 thereof positioned so that the shank of the lower bolt 262 extends upwardly therethrough. The upper bolt 260 is then engaged with the interior threads of the shank of the bolt 262 and screwed down tightly using the wing nut 270. The shank of the bolt 260 is externally threaded and is threadably engaged with the internal threads of the hollow shank of the bolt 262.

As illustrated in FIGS. 21 and 22, the anchor mechanisms 254 secure both of the ends of the seat belt 272 and the transverse rod 250 rigidly relative to the truck bed 177. One or two persons may thereby ride in the truck bed seated upon the floor 64 and leaning against the storage partition 100 which serves as a back support while the truck is moving. The seat belt 274 can then be conveniently fastened around the waist of the rider or riders so seated.

The storage partition 100 is equipped with a bungie cord 276 which is comprised of a heavy rubber strap 278 secured at one end to the stripping section 130 at the upper end of the concealed side of the storage partition 100. The free end of the rubber strap 278 has an aperture therethrough adapted to receive one portion of an S-shaped hook 280. The other hook portion of the S-hook 280 is of a curvature large enough to pass around and engage the transverse rod 250, as illustrated in FIGS. 21 and 22. When the S-hook 280 is engaged about the rod 250 the bungie cord 276 will tend to hold both the storage partition 100 and the storage lid 106 in position as illustrated in FIG. 21. Without the bungie cord 276 the storage partition 100 can flop rearwardly and the storage lid 106 can be jostled out of position.

As previously noted, the transverse rod 250 engages the partitions 46 and 50 by means of apertures therethrough and also serves as a seat belt anchor. Since the rod 250 is secured to the bottom of the truck bed 177, the anchor mechanisms 254 and the brackets 252 hold the entire removable truck bed furnishing assembly 10 in position even if the truck rolls over. Also, the rod 250 aids in preventing the several interconnectable elements of the furnishing assembly 10 from being jostled loose when the truck travels over rough terrain.

Undoubtedly, numerous variations and modifications of the invention will become readily apparent to those familiar with motor vehicles, particularly pick-up trucks. Accordingly, the scope of the invention should not be construed as limited to the specific embodiments and the manner of implementation described herein, but rather is defined in the claims appended hereto.

I claim:

1. A removable truck bed furnishing assembly comprising:
    a substantially rigid backboard with cushioning thereon adapted to extend across an internal width of a truck bed at a forward bulkhead thereof,
    left and right substantially rigid sideboards adapted to extend along an internal length of the truck bed and which are shaped at both longitudinal ends to rest on the bottom of a truck bed, and which define vertically recessed centers to bridge rear wheel wells in a truck bed, and also having longitudinal seat support rails mounted above said vertically recessed centers, and additionally having cushioning thereon,
    left and right side seat supports each having a pair of upright adjacent partitions joined together at a vertical hinge, and each adjacent pair begin relatively foldable about said hinge to a right angle orientation and having interiorly directed cushioning thereon,
    cushioned seats positionable atop said side seat supports and said seat support rails of said sideboards to cover the wheel wells of said truck bed,
    a floor for positioning on the bottom of the bed of said truck between said side seat supports and having a rigid backing with upwardly directed cushioning thereon,
    a cushioned tailgate cover adapted to be mounted upon an interior surface of a truck bed tailgate, said cover including a flexible skirt adapted to extend beneath said floor, and
    a plurality of releasable fasteners comprised of separable pieces which are laterally immobilized in vertical alignment and separable in vertical misalignment, said fasteners coupled to releasably interconnect said side seat supports to said sideboards and to said backboard.

2. A removable truck bed furnishing assembly according to claim 1 wherein said tailgate cover includes a rigid backing, and cushioning mounted on said backing and a plurality of said releasable fasteners for securing said tailgate cover to the interior surface of a tailgate of a truck.

3. A removable truck bed furnishing assembly according to claim 1 wherein one of said separable pieces of each releasable fastener is a member into which a vertical slot is defined with an enlarged entry at the upper extremity thereof and another of said separable pieces is a member having an enlarged head which passes through said enlarged entry and which is laterally immobilized within said slot beneath said enlarged entry.

4. A removable truck bed furnishing assembly according to claim 3 further comprising a reinforcing angle secured behind at least some of said members with an enlarged head to thereby provide stabilization to the interconnections of said sideboards, said side seat supports and said headboard.

5. A removable truck bed furnishing assembly according to claim 1 in which said vertical hinge joining said upright partitions of each of said seat supports is formed of a panel of fabric fastened to both of said adjacent partitions in each pair.

6. A removable truck bed furnishing assembly according to claim 1 wherein a storage partition with cushioning thereon is adapted to be located adjacent said backboard across a truck bed to extend between said left and right sideboards, and is releasably secured to said left and right side seat supports to define a storage space between said backboard and said storage partition, and a storage lid with cushioning thereon is supported by said backboard and by said side seat supports.

7. A removable truck bed furnishing assembly according to claim 6 further comprising pull-straps secured to the underside of said floor and of said storage lid to facilitate removal of said floor and said storage lid from the bed of a truck.

8. A removable truck bed furnishing assembly according to claim 6 further characterized in that said floor is equipped with outwardly directed, upwardly foldable ears attached to extend laterally from both sides of said backing behind said seat supports at the rear of said truck bed.

9. A removable truck bed furnishing assembly according to claim 1 further comprising a sideboard ear hinged to a rearmost extremity of each of said sideboards by an upright fabric hinge panel.

10. A removable truck bed furnishing assembly according to claim 1 further characterized in that one of said upright partitions in each of side seat supports is a longitudinally extending partition, whereby said longitudinally extending partitions of said left and right side seat supports are parallel to and face each other, and further comprising elevated, horizontal bed support rails mounted on both of said facing longitudinally extending partitions at the same level, whereby said floor is removable from a position in contact with the bottom of a bed of a pickup truck and is insertable between said left and right side seat supports at an elevated position supported from beneath by said bed support rails.

* * * * *